US012183253B2

(12) United States Patent
Park et al.

(10) Patent No.: US 12,183,253 B2
(45) Date of Patent: Dec. 31, 2024

(54) DISPLAY APPARATUS AND METHOD OF DRIVING THE SAME

(71) Applicant: Samsung Display Co., Ltd., Yongin-si (KR)

(72) Inventors: Sungjae Park, Seongnam-si (KR); Seunghwan Park, Anyang-si (KR); Namjae Lim, Yongin-si (KR); Youngwoon Choi, Seoul (KR); Sung-Mo Yang, Hwaseong-si (KR); Jinho Lee, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/990,171

(22) Filed: Nov. 18, 2022

(65) Prior Publication Data

US 2023/0162651 A1 May 25, 2023

(30) Foreign Application Priority Data

Nov. 19, 2021 (KR) ........................ 10-2021-0160756

(51) Int. Cl.
*G09G 3/20* (2006.01)

(52) U.S. Cl.
CPC ... *G09G 3/2092* (2013.01); *G09G 2310/0275* (2013.01); *G09G 2320/0271* (2013.01)

(58) Field of Classification Search
CPC ......... G09G 3/2092; G09G 2310/0275; G09G 2320/0271; G09G 3/3696; G09G 5/10; G09G 2310/061; G09G 2320/0257; G09G 2320/0261; G09G 2320/103; G09G 2330/021; G09G 2330/028; G09G 2360/16; G09G 3/20; G09G 3/3225; G09G 3/32; G09G 3/36; G09G 2320/06; G09G 2320/0673; G09G 5/001; G09G 2340/0435
See application file for complete search history.

(56) References Cited

U.S. PATENT DOCUMENTS 6,466,225 B1 * 10/2002 Larkin ..................... G09G 3/36 358/3.1
7,667,720 B2 2/2010 Kimura
(Continued)

FOREIGN PATENT DOCUMENTS

KR 1020200029178 A 3/2020
KR 1020200057295 A 5/2020

OTHER PUBLICATIONS

Extended European Search Report—European Patent Application No. 22208271.1 dated Jul. 3, 2023, citing reference listed within.

*Primary Examiner* — Jose R Soto Lopez
(74) *Attorney, Agent, or Firm* — CANTOR COLBURN LLP

(57) ABSTRACT

A display apparatus includes: a display panel; a driving controller, which receives input image data including a plurality of normal image frames and a plurality of black image frames, receives a flag indicating a type of each of frames included in the input image data, generates intermediate image data by adjusting a grayscale of the input image data based on the input image data and the flag, and generates a data signal based on the intermediate image data where the type includes a normal image frame and a black image frame; and a data driver, which generates a data voltage based on the data signal and outputs the data voltage to the display panel.

22 Claims, 7 Drawing Sheets

(56) References Cited

U.S. PATENT DOCUMENTS

| | | | | | |
|---|---|---|---|---|---|
| 9,008,363 | B1 * | 4/2015 | Klier | G06T 7/269 | 382/103 |
| 2004/0179002 | A1 * | 9/2004 | Park | G09G 3/3648 | 345/204 |
| 2005/0122295 | A1 * | 6/2005 | Sawabe | G09G 3/3614 | 345/88 |
| 2006/0038837 | A1 * | 2/2006 | Hong | G09G 3/3648 | 345/691 |
| 2006/0164355 | A1 * | 7/2006 | Kim | G09G 3/3648 | 345/89 |
| 2007/0035502 | A1 * | 2/2007 | Kawaguchi | G09G 3/3648 | 345/98 |
| 2007/0155840 | A1 | 7/2007 | Sauer et al. | | |
| 2007/0229434 | A1 * | 10/2007 | Liao | G09G 3/20 | 345/98 |
| 2007/0236439 | A1 * | 10/2007 | Chen | G09G 3/2007 | 345/89 |
| 2007/0285693 | A1 * | 12/2007 | Kim | G09G 3/3688 | 358/1.9 |
| 2008/0002069 | A1 * | 1/2008 | Abe | H04N 7/0135 | 348/E3.015 |
| 2008/0024517 | A1 * | 1/2008 | Kerofsky | G09G 3/2007 | 345/600 |
| 2008/0068359 | A1 * | 3/2008 | Yoshida | G09G 3/3406 | 345/204 |
| 2008/0068395 | A1 * | 3/2008 | Mori | G09G 3/2025 | 345/592 |
| 2008/0079672 | A1 * | 4/2008 | Hsu | G09G 3/3648 | 345/87 |
| 2008/0111835 | A1 * | 5/2008 | Hu | G09G 3/3611 | 345/690 |
| 2008/0136761 | A1 * | 6/2008 | Hong | G09G 3/2022 | 345/89 |
| 2008/0231579 | A1 * | 9/2008 | Vasquez | G09G 3/3648 | 345/98 |
| 2008/0238854 | A1 * | 10/2008 | Kimura | G09G 3/3648 | 345/98 |
| 2008/0266580 | A1 * | 10/2008 | Choi | G06T 3/40 | 358/1.2 |
| 2008/0297457 | A1 * | 12/2008 | Song | G09G 3/3648 | 345/89 |
| 2009/0059068 | A1 * | 3/2009 | Hanaoka | G09G 3/20 | 348/E7.003 |
| 2009/0087016 | A1 * | 4/2009 | Berestov | H04N 5/57 | 348/E5.108 |
| 2009/0109135 | A1 * | 4/2009 | Ooishi | G09G 3/20 | 345/55 |
| 2009/0109247 | A1 * | 4/2009 | Kimura | G09G 3/3666 | 345/690 |
| 2009/0128478 | A1 * | 5/2009 | Dembo | G09G 3/3648 | 345/98 |
| 2009/0160828 | A1 * | 6/2009 | Chung | G09G 3/2092 | 345/98 |
| 2009/0237347 | A1 * | 9/2009 | Yamagishi | G09G 3/3406 | 345/102 |
| 2009/0267881 | A1 * | 10/2009 | Takaki | G09G 3/3648 | 345/89 |
| 2010/0002133 | A1 * | 1/2010 | Ueno | H04N 7/014 | 348/E7.003 |
| 2010/0097394 | A1 * | 4/2010 | Lu | G09G 5/005 | 345/603 |
| 2010/0134451 | A1 * | 6/2010 | Cho | G09G 3/3677 | 345/205 |
| 2010/0231496 | A1 * | 9/2010 | Yu | G09G 3/20 | 345/98 |
| 2010/0295841 | A1 * | 11/2010 | Matsuda | G09G 3/3685 | 345/213 |
| 2010/0309173 | A1 * | 12/2010 | Matsuda | G09G 3/3674 | 345/204 |
| 2011/0032235 | A1 * | 2/2011 | Nose | G09G 3/3611 | 345/211 |
| 2011/0063320 | A1 * | 3/2011 | Chen | G09G 3/20 | 345/589 |
| 2011/0090308 | A1 * | 4/2011 | Chen | H04N 13/10 | 348/43 |
| 2011/0175935 | A1 * | 7/2011 | S | H05B 45/20 | 345/213 |
| 2011/0227941 | A1 * | 9/2011 | Huang | H04N 1/6027 | 345/596 |
| 2011/0285759 | A1 * | 11/2011 | Sakai | G09G 3/3648 | 345/89 |
| 2012/0086706 | A1 * | 4/2012 | Lee | H04N 13/144 | 345/204 |
| 2012/0147068 | A1 * | 6/2012 | Gondo | G09G 3/3406 | 345/690 |
| 2012/0162290 | A1 * | 6/2012 | Shiomi | H04N 7/0132 | 345/204 |
| 2012/0236048 | A1 * | 9/2012 | Tseng | G09G 3/3651 | 345/88 |
| 2012/0299907 | A1 * | 11/2012 | Kim | G09G 3/3413 | 345/589 |
| 2012/0327140 | A1 * | 12/2012 | Wu | G09G 3/3648 | 345/89 |
| 2013/0063428 | A1 * | 3/2013 | Choi | G09G 3/342 | 345/419 |
| 2013/0076769 | A1 * | 3/2013 | Park | G09G 3/3648 | 345/547 |
| 2013/0243345 | A1 * | 9/2013 | Seki | G09G 5/393 | 382/233 |
| 2013/0271436 | A1 * | 10/2013 | Shiomi | G09G 3/3648 | 345/204 |
| 2014/0028640 | A1 * | 1/2014 | Kimura | G09G 3/36 | 345/204 |
| 2014/0028740 | A1 * | 1/2014 | Shin | G09G 3/003 | 345/691 |
| 2014/0313236 | A1 * | 10/2014 | Jang | G09G 5/02 | 345/204 |
| 2014/0369421 | A1 * | 12/2014 | Zhu | H04N 19/17 | 375/240.26 |
| 2015/0062200 | A1 * | 3/2015 | Yang | G09G 3/003 | 345/99 |
| 2015/0156469 | A1 * | 6/2015 | Qu | G09G 5/36 | 348/43 |
| 2016/0078830 | A1 * | 3/2016 | Huang | G09G 3/3406 | 345/691 |
| 2016/0275842 | A1 * | 9/2016 | Seok | G09G 3/3233 | |
| 2017/0076442 | A1 * | 3/2017 | Schoenmeyer | G06T 7/11 | |
| 2017/0140717 | A1 * | 5/2017 | Ji | G09G 3/3677 | |
| 2017/0169758 | A1 * | 6/2017 | Park | G09G 3/2096 | |
| 2017/0193903 | A1 * | 7/2017 | Xu | G09G 3/3208 | |
| 2017/0223228 | A1 * | 8/2017 | Shaw | G06T 3/40 | |
| 2017/0301301 | A1 * | 10/2017 | Pan | G09G 3/3618 | |
| 2018/0007311 | A1 * | 1/2018 | Kato | G09G 5/18 | |
| 2018/0040279 | A1 * | 2/2018 | Kimura | G02F 1/133602 | |
| 2018/0102106 | A1 * | 4/2018 | Shintani | H04N 21/42607 | |
| 2018/0268761 | A1 * | 9/2018 | Kuo | G09G 3/34 | |
| 2018/0315355 | A1 * | 11/2018 | Hu | G09G 3/34 | |
| 2019/0114973 | A1 * | 4/2019 | Zha | G09G 3/3406 | |
| 2019/0197959 | A1 * | 6/2019 | Noh | G09G 3/3233 | |
| 2019/0333456 | A1 * | 10/2019 | Lim | G09G 3/3406 | |
| 2020/0302573 | A1 * | 9/2020 | Liu | G06T 7/11 | |
| 2021/0225315 | A1 * | 7/2021 | Fu | G09G 3/006 | |
| 2021/0319740 | A1 | 10/2021 | Pyun et al. | | |
| 2022/0172688 | A1 * | 6/2022 | Chen | G09G 3/3611 | |
| 2023/0025347 | A1 * | 1/2023 | Cheng | G06T 7/0002 | |
| 2023/0138053 | A1 * | 5/2023 | Liu | G06V 20/40 | 382/156 |
| 2023/0154144 | A1 * | 5/2023 | Engel | G06V 10/774 | 382/159 |
| 2023/0162690 | A1 * | 5/2023 | Li | G09G 3/3283 | 345/77 |
| 2023/0169929 | A1 * | 6/2023 | Chen | G09G 3/3406 | 345/691 |

* cited by examiner

DISPLAY APPARATUS AND METHOD OF DRIVING THE SAME

This application claims priority to Korean Patent Application No. 10-2021-0160756, filed on Nov. 19, 2021, and all the benefits accruing therefrom under 35 U.S.C. § 119, the content of which in its entirety is herein incorporated by reference.

BACKGROUND

1. Field

Embodiments relate to a display apparatus and a method of driving the same. More particularly, embodiments relate to the display apparatus and the method of driving the same capable of operating in a mode of displaying an image in which a black image frame is inserted between normal image frames.

2. Description of the Related Art

In general, a display apparatus includes a display panel and a display panel driver. The display panel includes a plurality of gate lines, a plurality of data lines, and a plurality of pixels. The display panel driver includes a gate driver providing a gate signal to the plurality of gate lines and a data driver providing a data voltage to the data lines. The display panel driver includes a power voltage generator outputting a power voltage to the display panel. The display panel driver includes a driving controller controlling operations of the gate driver, the data driver, and the power voltage generator.

The display apparatus may operate in a mode of displaying an image in which a black image frame is inserted between normal image frames to reduce motion blur.

SUMMARY

Embodiments provide a display apparatus with improved display quality.

Other embodiments provide a method of driving the display apparatus.

A display apparatus according to an embodiment includes: a display panel; a driving controller, which receives input image data including a plurality of normal image frames and a plurality of black image frames, receives a flag indicating a type of each of frames included in the input image data, generates intermediate image data by adjusting a gray scale of the input image data based on the input image data and the flag, and generates a data signal based on the intermediate image data, where the type includes a normal image frame and a black image frame; and a data driver, which generates a data voltage based on the data signal and outputs the data voltage to the display panel.

In an embodiment, in the input image data, the normal image frames and the black image frames may be alternated.

In an embodiment, the flag may indicate whether each of the frames included in the input image data is the normal image frame or the black image frame.

In an embodiment, the driving controller may include a net power controller, which generates a first scale factor based on an N-th frame among the frames included in the input image data, generates a second scale factor by reflecting a compensation value in the first scale factor, and generates the intermediate image data by adjusting a grayscale of an (N+1)-th frame by applying the second scale factor corresponding to the N-th frame, and N is a natural number equal to or greater than 2.

In an embodiment, if the N-th frame is the black image frame, the net power controller may generate the intermediate image data by adjusting the gray scale of the (N+1)-th frame by applying the second scale factor corresponding to an (N−1)-th frame.

In an embodiment, the driving controller may further include a logo compensator, which determines that a logo is included in the input image data when a fixed image within a reference size range in the frames included in the input image data is maintained for a predetermined number of frames, and generates a first compensation value to compensate the first scale factor.

In an embodiment, the logo compensator may determine that the logo is included in the input image data when the fixed image is maintained in the normal image frames among the frames included in the input image data for a predetermined number of frames.

In an embodiment, the logo compensator may determine that the logo is included in the input image data, when the fixed image is maintained in the predetermined number of the frames included in the input image data, determines that the fixed image exists in the N-th frame when the fixed image exist in an (N−1)-th frame if the N-th frame is the black image frame, and determines that the fixed image does not exist in the N-th frame when the fixed image does not exist in the (N−1)-th frame if the N-th frame is the black image frame.

In an embodiment, the driving controller may further include a screen saver, which determines that a still image is included in the input image data, when the same image in the frames included in the input image data is maintained for a predetermined number of frames, and generates a second compensation value to compensate the first scale factor.

In an embodiment, the screen saver may determine that the still image is included in the input image data, when the same image is maintained in the normal image frames among the frames included in the input image data for the predetermined number of the normal image frames.

In an embodiment, the screen saver may determine that the still image is included in the input image data when the same image is maintained in the predetermined number of the frames included in the input image data, and determine whether the N-th frame includes the same image as an (N−1)-th frame if the N-th frame is the black image frame.

In an embodiment, the driving controller may further include a global current manager, which calculates a target current based on the N-th frame and the first scale factor generated based on the N-th frame, and generates a third compensation value to compensate the first scale factor by comparing the target current and a sensing current of the display panel.

In an embodiment, if the N-th frame is the black image frame, the global current manager may generate the same value as the third compensation value corresponding to a (N−1)-th frame to the third compensation value corresponding to the N-th frame.

In an embodiment, the display apparatus may further include a power voltage generator, which generates a power voltage and outputs the power voltage to the display panel, and the driving controller may further include a power voltage compensator, which generates a power voltage control signal based on the N-th frame and the first scale factor generated based on the N-th frame, and the power voltage generator may generate the power voltage of an (N+1)-th frame by reflecting the power voltage control signal corresponding to the N-th frame.

In an embodiment, if the N-th frame is the black image frame, the power voltage compensator may generate the same signal as the power voltage control signal corresponding to an (N−1)-th frame to the power voltage control signal corresponding to the N-th frame.

A display apparatus according to an embodiment includes: a display panel; a driving controller, which receives input image data including a plurality of normal image frames, generates intermediate image data in which some of the normal image frames are converted into black image frames by adjusting a grayscale of the input image data, and generates a data signal based on the intermediate image data; and a data driver, which generates a data voltage based on the data signal and outputs the data voltage to the display panel.

In an embodiment, the driving controller may include a net power controller, which generates a first scale factor based on a K-th frame among the normal image frames included in the input image data, generates a second scale factor by reflecting a compensation value in the first scale factor, and generates the intermediate image data by adjusting a grayscale of a (K+1)-th frame by applying the second scale factor corresponding to the K-th frame, and the net power controller may generate the second scale factor as 0 with respect to any one of odd-numbered frames and even-numbered frames among the normal image frames included in the input image data (K is a natural number equal to or greater than 1).

In an embodiment, the driving controller may further include a logo compensator, which determines that a logo is included in the input image data, when a fixed image within a reference size range in the normal image frames included in the input image data is maintained for a predetermined number of frames, and generates a first compensation value to compensate the first scale factor.

In an embodiment, the driving controller may further include a screen saver, which determines that a still image is included in the input image data, when the same image in the normal image frames included in the input image data is maintained for a predetermined number of frames, and generates a second compensation value to compensate the first scale factor.

In an embodiment, the driving controller may further include a global current manager, which calculates a target current based on the first scale factor generated based on the N-th frame and the N-th frame, and generates a third compensation value to compensate the first scale factor by comparing the target current and a sensing current of the display panel.

In an embodiment, the display apparatus may further include a power voltage generator, which generates a power voltage and outputs the power voltage to the display panel, and the driving controller may further include a power voltage compensator, which generates a power voltage control signal based on the K-th frame and the first scale factor generated based on the K-th frame, and the power voltage generator may generate the power voltage of a (K+1)-th frame by reflecting the power voltage control signal corresponding to the K-th frame.

A method of driving a display apparatus according to an embodiment includes receiving input image data including a plurality of normal image frames and a plurality of black image frames and receiving a flag indicating a type of each of frames included in the input image data, wherein the type includes a normal image frame and a black image frame; generating intermediate image data by adjusting a grayscale of the input image data based on the input image data and the flag; generating a data signal based on the intermediate image data; and generating a data voltage based on the data signal and outputting the data voltage to the display panel.

In an embodiment, in the input image data, the normal image frames and the black image frames may be alternated.

In an embodiment, the flag may indicate whether each of the frames included in the input image data is the normal image frame or the black image frame.

In a display apparatus according to embodiments of the present disclosure, in a mode of displaying an image in which the black image frame is inserted between the normal image frames, the driving controller may receive a second input image data including the normal image frames and the black image frames from a host and may receive the flag indicating the type of each of the frames included in the second input image data. Accordingly, the driving controller may be accurately inputted whether each frame included in the second input image data is the normal image frame or the black image frame. The driving controller may generate the intermediate image data by appropriately calculating the scale factor and a compensation value to adjust the grayscale of the second input image data based on this. Accordingly, it is possible to prevent a decrease in display quality of the display apparatus due to a malfunction of the driving controller.

DETAILED DESCRIPTION

Figure 1:
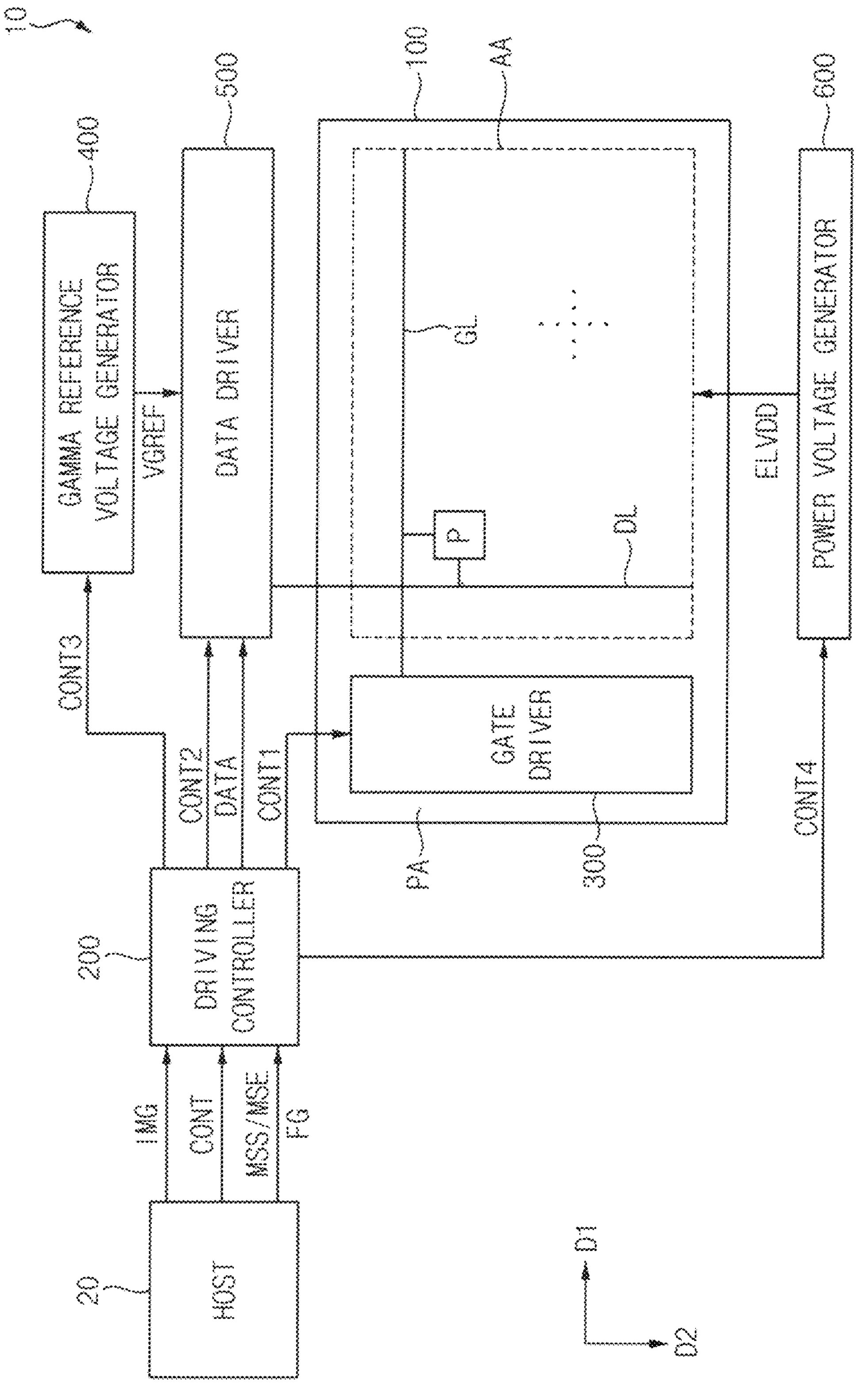
FIG. 1 is a block diagram illustrating a display apparatus according to embodiments.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Hereinafter, display apparatuses in accordance with embodiments will be described in more detail with reference to the accompanying drawings. The same reference numerals are used for the same components in the drawings, and redundant descriptions of the same components will be omitted.

FIG. 1 is a block diagram illustrating a display apparatus according to embodiments.

Referring to FIG. 1, a display apparatus 10 according to an embodiment may include a display panel 100 and a display panel driver. The display panel driver may include a driving controller 200, a gate driver 300, a gamma reference voltage generator 400, a data driver 500, and a power voltage generator 600.

In an embodiment, for example, the driving controller 200 and the data driver 500 may be integrally formed. In an embodiment, for example, the driving controller 200, the gamma reference voltage generator 400, and the data driver 500 may be integrally formed. In an embodiment, for example, the driving controller 200, the gamma reference voltage generator 400, the data driver 500, and the power voltage generator 600 may be integrally formed. A driving module in which at least the driving controller 200 and the data driver 500 are integrally formed may be referred to as a Timing Controller Embedded Data Driver ("TED").

The display panel 100 may include a display portion AA displaying an image and a peripheral portion PA disposed adjacent to the display portion AA.

In an embodiment, for example, the display panel 100 may be an organic light emitting diode display panel including an organic light emitting diode. In an embodiment, for example, the display panel 100 may be a quantum-dot organic light emitting diode display panel including an organic light emitting diode and a quantum-dot color filter. In an embodiment, for example, the display panel 100 may be a quantum-dot nano light emitting diode display panel including a nano light emitting diode and a quantum-dot color filter. Alternatively, the display panel 100 may be a liquid crystal display panel including a liquid crystal layer.

The display panel 100 may operate in a first mode and a second mode. In an embodiment, for example, the display panel 100 may display a normal image including a plurality of normal image frames in the first mode. In an embodiment, for example, the display panel 100 may display a black frame-inserted image including a plurality of normal image frames and a plurality of black image frames in the second mode. In the black frame-inserted image, the normal image frames and the black image frames may be alternated. As used herein, the black image frame is a frame of which the image is black. In other words, a grayscale of the image in the black image frame is zero. When the display panel 100 is operated in the second mode, motion blur may be reduced.

The display panel 100 may include a plurality of gate lines GL, a plurality of data lines DL, and a plurality of pixels P electrically connected to each of the gate lines GL and the data lines DL. The gate lines GL may extend in a first direction D1, and the data lines DL may extend in a second direction D2 intersecting the first direction D1. In an embodiment, for example, the second direction D2 may be perpendicular to the first direction D1.

In an embodiment, the display panel driver may further include a sensing unit receiving a sensing signal from the pixels P of the display panel 100. The sensing unit may be disposed in the data driver 500. When the data driver 500 has a form of a data driving IC, the sensing unit may be disposed in the data driving IC.

The driving controller 200 may receive input image data IMG and an input control signal CONT from a host 20. The host 20 may be a system on chip ("SOC") or an application processor ("AP") chip in which various components are integrated into one chip. The driving controller 200 may further receive a mode start signal MSS indicating a start of the second mode or a mode end signal MSE indicating an end of the second mode from the host 20.

The input image data IMG may include red image data, green image data, and blue image data. The input image data IMG may include white image data. The input image data IMG may include magenta image data, yellow image data, and cyan image data.

Figure 2:
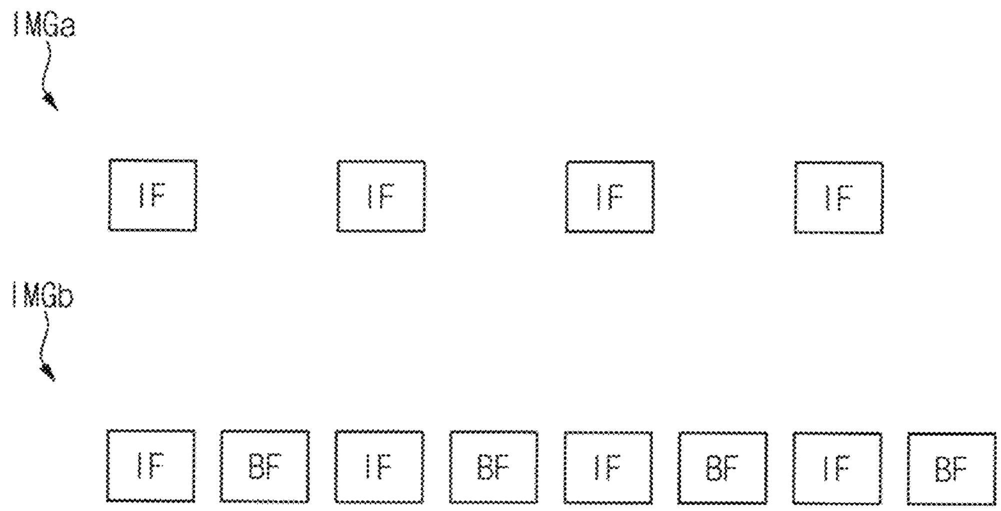
FIG. 2 is a conceptual diagram illustrating an example of input image data of FIG. 1.
Figure 3:
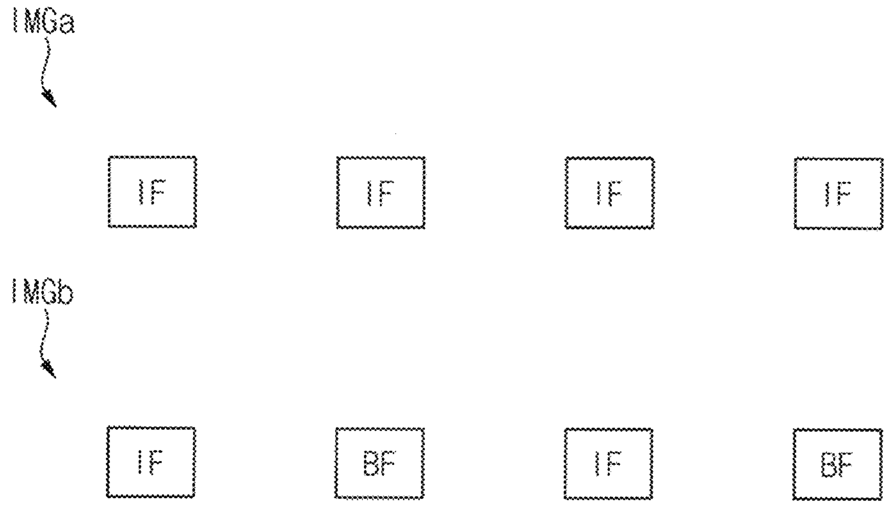
FIG. 3 is a conceptual diagram illustrating another example of input image data of FIG. 1.

FIG. 2 is a conceptual diagram illustrating an example of input image data of FIG. 1. FIG. 3 is a conceptual diagram illustrating another example of input image data of FIG. 1.

Referring to FIGS. 1 to 3, in an embodiment, the driving controller 200 may receive first input image data IMGa or second input image data IMGb from the host 20.

The driving controller 200 may receive the first input image data IMGa in the first mode (e.g., during a period from when the mode end signal MSE is received to before the mode start signal MSS is received). As illustrated in FIGS. 2 and 3, the first input image data IMGa may include a plurality of normal image frames IF. Hereinafter, a frame may mean frame data.

The driving controller 200 may receive the second input image data IMGb in the second mode (e.g., during a period from when the mode start signal MSS is received to before the mode end signal MSE is received). As illustrated in FIGS. 2 and 3, the second input image data IMGb may include a plurality of normal image frames IF and a plurality of black image frames BF. In an embodiment, for example, in the second input image data IMGb, the normal image frames IF and the black image frames BF may be alternated.

In an embodiment, as illustrated in FIG. 2, a frequency of the second input image data IMGb may be greater than a frequency of the first input image data IMGa. In an embodiment, for example, the number of normal image frames IF and the number of black image frames BF included in the second input image data IMGb for a predetermined time may each be equal to the number of normal image frames IF included in the first input image data IMGa for the same predetermined time. In this case, the frequency of the second input image data IMGb may be twice the frequency of the first input image data IMGa.

In another embodiment, as illustrated in FIG. 3, the frequency of the second input image data IMGb may be the same as the frequency of the first input image data IMGa. In an embodiment, for example, the number of normal image frames IF included in the second input image data IMGb for a predetermined time may be less than the number of normal image frames IF included in the first input image data IMGa for the same predetermined time. In an embodiment, for example, the number of normal image frames IF and the number of black image frames BF included in the second input image data IMGb for a predetermined time may each be a half of the number of normal image frames IF included in the first input image data IMGa for the same predetermined time. In this case, the frequency of the second input image data IMGb may be equal to the frequency of the first input image data IMGa.

Referring back to FIG. 1, in an embodiment, the driving controller 200 may further receive a flag FG indicating a type of each of frames included in the input image data IMG from the host 20 in the second mode (e.g., during a period from when the mode start signal MSS is received to before the mode end signal MSE is received). In an embodiment, for example, the driving controller 200 may receive the flag FG together with the mode start signal MSS. The driving controller 200 may receive the flag FG continuously until receiving the mode end signal MSE.

In an embodiment, the flag FG may indicate whether each of the frames included in the second input image data IMGb is the normal image frame IF or the black image frame BF. In an embodiment, for example, the flag FG may indicate whether each frame is a normal image frame IF or a black image frame BF in units of frames. As another example, the flag FG may indicate whether a first frame included in the second input image data IMGb is the normal image frame IF or the black image frame BF.

As the driving controller 200 receives the flag FG together with the mode start signal MSS, the driving controller 200 may be accurately synchronized with a start time of the second mode and the type of each frame included in the second input image data IMGb. That is, the driving controller 200 may be accurately inputted whether each frame included in the second input image data IMGb inputted in the second mode is the normal image frame IF or the black image frame BF.

The input control signal CONT may include a master clock signal and a data enable signal. The input control signal CONT may further include a vertical synchronization signal and a horizontal synchronization signal.

The driving controller 200 may generate a first control signal CONT1 for controlling an operation of the gate driver 300 based on the input control signal CONT. The driving controller 200 may output the first control signal CONT1 to the gate driver 300. The first control signal CONT1 may include a vertical start signal and a gate clock signal.

The driving controller 200 may generate a second control signal CONT2 for controlling an operation of the data driver 500 based on the input control signal CONT. The driving controller 200 may output the second control signal CONT2 to the data driver 500. The second control signal CONT2 may include a horizontal start signal and a load signal.

The driving controller 200 may generate the data signal DATA based on the input image data IMG. The driving controller 200 may output the data signal DATA to the data driver 500.

The driving controller 200 may generate a third control signal CONT3 for controlling an operation of the gamma reference voltage generator 400 based on the input control signal CONT. The driving controller 200 may output the third control signal CONT3 to the gamma reference voltage generator 400.

The driving controller 200 may generate a fourth control signal CONT4 for controlling an operation of the power voltage generator 600 based on the input control signal CONT. The driving controller 200 may output the fourth control signal CONT4 to the power voltage generator 600. The fourth control signal CONT4 may include a power voltage control signal to adjust the power voltage.

The gate driver 300 may generate gate signals for driving the gate lines GL in response to the first control signal CONT1 received from the driving controller 200. The gate driver 300 may output the gate signals to the gate lines GL. In an embodiment, for example, the gate driver 300 may sequentially output the gate signals to the gate lines GL.

In an embodiment, the gate driver 300 may be integrated on the peripheral portion PA of the display panel 100.

The gamma reference voltage generator 400 may generate the gamma reference voltage VGREF in response to the third control signal CONT3 received from the driving controller 200. The gamma reference voltage generator 400 may output the gamma reference voltage VGREF to the data driver 500. The gamma reference voltage VGREF may have a value corresponding to each data signal DATA.

In an embodiment, the gamma reference voltage generator 400 may be disposed in the driving controller 200 or in the data driver 500.

The data driver 500 may receive the second control signal CONT2 and the data signal DATA from the driving controller 200, and receive the gamma reference voltage VGREF from the gamma reference voltage generator 400. The data driver 500 may convert the data signal DATA into an analog data voltage using the gamma reference voltage VGREF. The data driver 500 may output the data voltage to the data line DL.

The power voltage generator 600 may generate the power voltage ELVDD and output the power voltage ELVDD to the display panel 100. The power voltage generator 600 may generate a low power voltage and output the low power voltage to the display panel 100. In addition, the power voltage generator 600 may generate a gate driving voltage for driving the gate driver 300 and output the gate driving voltage to the gate driver 300, and generate a data driving voltage for driving the data driver 500 and output the data driving voltage to the data driver 500.

Figure 4:
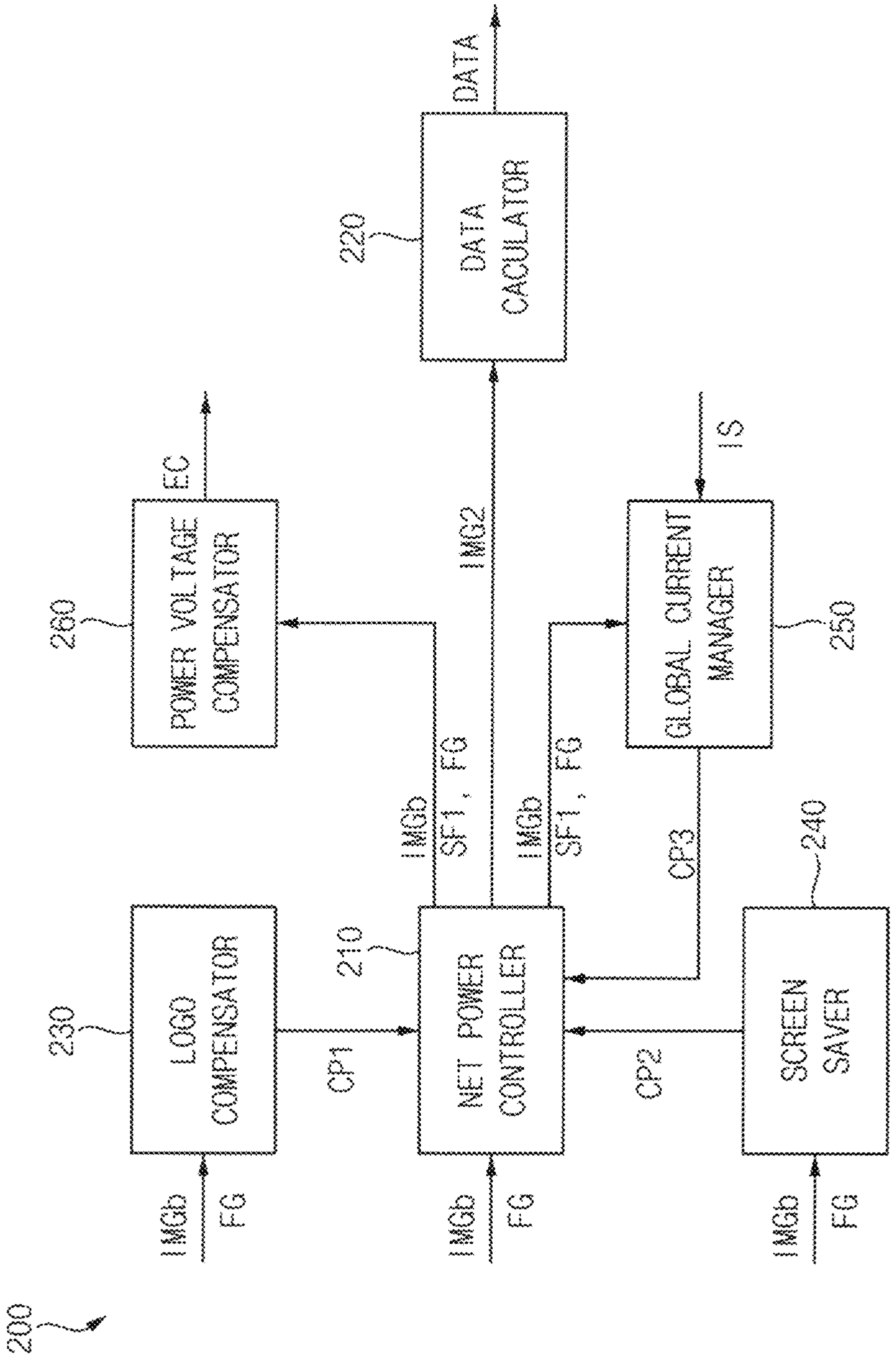
FIG. 4 is a block diagram illustrating an example of a driving controller of FIG. 1.

FIG. 4 is a block diagram illustrating an example of a driving controller of FIG. 1.

In an embodiment, for example, FIG. 4 may illustrate an operation of the driving controller 200 in the second mode. Hereinafter, the operation of the driving controller 200 in the second mode will be described with reference to FIGS. 1 and 4, and in the following description, the explanation that the description is related to the second mode may be omitted.

Referring to FIGS. 1 and 4, the driving controller 200 may receive the second input image data IMGb and the flag FG from the host 20, and generate intermediate image data IMG2 by adjusting a grayscale of the second input image data IMGb based on the second input image data IMGb and the flag FG. The driving controller 200 may generate the data signal DATA based on the intermediate image data IMG2 and output the data signal DATA to the data driver 500.

As the driving controller 200 receives the flag FG from the host 20, the driving controller 200 may be accurately informed whether each frame included in the second input image data IMGb inputted in the second mode is the normal image frame IF or the black image frame BF. The driving controller 200 may generate the intermediate image data IMG2 by appropriately calculating a scale factor and a compensation value to adjust the grayscale of the second input image data IMGb based on the second input image data IMGb and the flag FG. Therefore, in the second mode, it may be prevented that the driving controller 200 incorrectly determines the type of each frame included in the second input image data IMGb (e.g., determines the normal image frame IF as the black image frame BF or determines the black image frame BF as the normal image frame IF), and generates the intermediate image data IMG2 based on the second input image data IMGb and the flag FG. Accordingly, it is possible to effectively prevent a decrease in display quality of the display apparatus 10 due to a malfunction of the driving controller 200 in the second mode.

In an embodiment, as illustrated in FIG. 4, the driving controller 200 may include a net power controller 210 and a data calculator 220.

The net power controller 210 may generate the intermediate image data IMG2 based on the second input image data IMGb and the flag FG. In an embodiment, for example, the net power controller 210 may calculate a load of the second input image data IMGb, and may generate a scale factor by comparing the load and a reference load. The net power controller 210 may generate the intermediate image data IMG2 by applying the scale factor to reduce or maintain the grayscale value of the second input image data IMGb.

When the load of the second input image data IMGb exceeds the reference load, it may be defined that a net power control operation is turned on, and when the load of the second input image data IMGb is equal to or less than the reference load, it may be defined that the net power control operation is turned off.

The net power controller 210 may calculate the load of the second input image data IMGb by summing all grayscales of the second input image data IMGb or sampling some grayscales among all the grayscales. The load of the second input image data IMGb and the scale factor may be calculated in units of frames.

Since it takes a certain time for the net power controller 210 to calculate the load of the second input image data IMGb, one frame delay may be applied to the net power control operation. That is, the net power controller 210 may generate a scale factor corresponding to a N-th frame by comparing a load of the N-th frame of the second input image data IMGb and the reference load and generate the intermediate image data IMG2 by adjusting a grayscale of (N+1)-th frame by applying the scale factor corresponding to the N-th frame (N is a natural number equal to or greater than 2). In an embodiment, for example, when the load of the N-th frame exceeds the reference load, a net power control operation may be turned on in the (N+1)-th frame, and when the load of the N-th frame is less than or equal to the reference load, the net power control operation may be turned off in the (N+1)-th frame.

In a case that the N-th frame is the black image frame BF, if the same rule that the intermediate image data IMG2 is generated by applying the scale factor corresponding to the N-th frame to the (N+1)-th frame, the net power control operation may always be turned off in the normal image frames IF, since the load of the black image frame BF is less than the reference load, and the (N+1)-th frame is the normal image frame IF. To prevent this, the operation of the net power controller 210 may vary according to the type of the N-th frame (e.g., whether the normal image frame IF or the black image frame BF). In an embodiment, for example, if the N-th frame is the black image frame BF, the net power controller 210 may maintain an operation state of the previous frame. That is, if the N-th frame is the black image frame BF, the net power controller 210 may generate the intermediate image data IMG2 by adjusting the grayscale of the (N+1)-th frame by applying the scale factor corresponding to the (N−1)-th frame that is the normal image frame IF to the (N+1)-th frame that is the normal image frame IF.

The net power controller 210 may output the intermediate image data IMG2 to the data calculator 220. The data calculator 220 may generate the data signal DATA based on the intermediate image data IMG2 and output the data signal DATA to the data driver 500.

Figure 5:
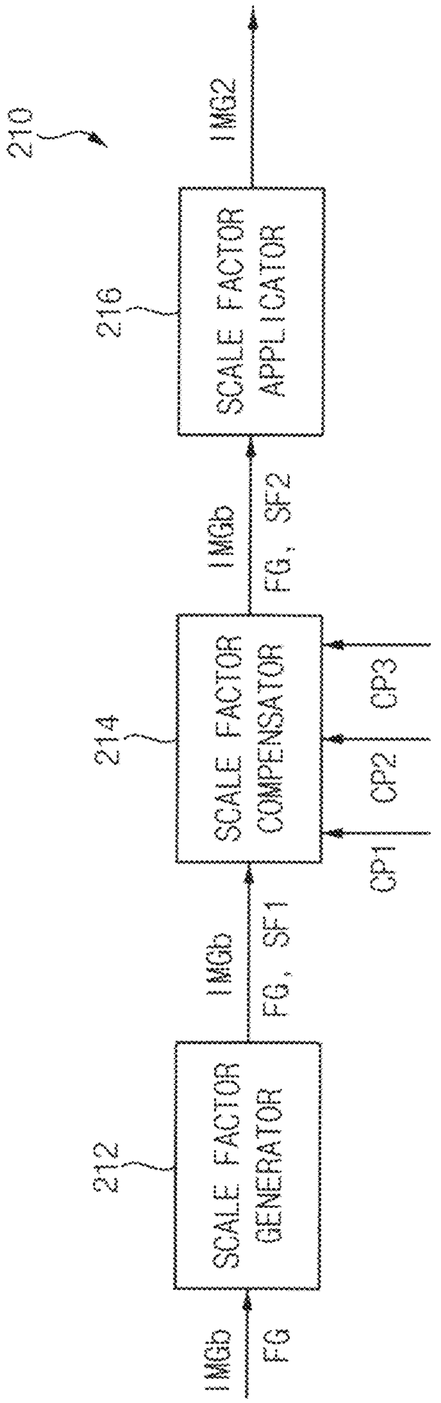
FIG. 5 is a block diagram illustrating a net power controller of FIG. 4.

FIG. 5 is a block diagram illustrating a net power controller of FIG. 4.

Referring to FIGS. 4 and 5, in an embodiment, the net power controller 210 may include a scale factor generator 212, a scale factor compensator 214, and a scale factor applicator 216.

The scale factor generator 212 may receive the second input image data IMGb from the host 20. The scale factor generator 212 may calculate a load of the second input image data IMGb based on the grayscale of the second input image data IMGb and generate a first scale factor SF1 of the second input image data IMGb comparing the load and a reference load. In an embodiment, for example, the first scale factor SF1 may be greater than or equal to 0 and less than or equal to 1.

The scale factor generator 212 may calculate and generate the load of the second input image data IMGb and the first scale factor SF1 in units of frames.

The scale factor compensator 214 may receive the second input image data IMGb and the first scale factor SF1 from the scale factor generator 212. The scale factor compensator 214 may generate a second scale factor SF2 of the second input image data IMGb by reflecting the compensation value in the first scale factor SF1. In an embodiment, for example, the second scale factor SF2 may be greater than or equal to 0 and less than or equal to 1.

The scale factor compensator 214 may generate the second scale factor SF2 of the second input image data IMGb in units of frames.

The scale factor applicator 216 may receive the second input image data IMGb and the second scale factor SF2 from the scale factor compensator 214. The scale factor applicator 216 may generate the intermediate image data IMG2 by adjusting the grayscale of the second input image data IMGb by applying the second scale factor SF2 to the second input image data IMGb. In an embodiment, for example, when the second scale factor SF2 is 0.5, the intermediate image data IMG2 in which a grayscale value or a pixel code value of the second input image data IMGb is reduced by half may be generated.

The scale factor applicator 216 may generate the intermediate image data IMG2 by applying the second scale factor SF2 to the second input image data IMGb in units of frames.

Also, as described above, one frame delay may be applied to the net power control operation. That is, the scale factor generator 212 may generate the first scale factor SF1 based on the N-th frame. The scale factor compensator 214 may generate the second scale factor SF2 by reflecting the compensation value in the first scale factor SF1 corresponding to the N-th frame. The scale factor applicator 216 may generate the intermediate image data IMG2 by adjusting the grayscale of the (N+1)-th frame by applying the second scale factor SF2 corresponding to the N-th frame.

In an embodiment, the scale factor generator 212, the scale factor compensator 214, and the scale factor applicator 216 may further receive the flag FG from the host 20. If the N-th frame is the black image frame BF, the scale factor generator 212, the scale factor compensator 214, and the scale factor applicator 216 may maintain the operation state of the previous frame. That is, if the N-th frame is the black image frame BF, the scale factor applicator 216 may generate the intermediate image data IMG2 by applying the second scale factor SF2 corresponding to the (N−1)-th frame to the (N+1)-th frame that is the normal image frame IF. In an embodiment, for example, if the N-th frame is the black image frame BF, the scale factor generator 212 may not calculate the load of the N-th frame.

In an embodiment, as illustrated in FIG. 4, the driving controller 200 may further include a logo compensator 230.

The logo compensator 230 may receive the second input image data IMGb from the host 20. The logo compensator 230 may determine whether a logo is included in the second input image data IMGb. When it is determined that the logo is included in the second input image data IMGb, the logo compensator 230 may generate a first compensation value CP1 for compensating the first scale factor SF1 and output the first compensation value CP1 to the net power. The net power controller 210 may generate the second scale factor SF2 by reflecting the first compensation value CP1 in the first scale factor SF1.

The logo compensator 230 may determine whether a fixed image is included in the second input image data IMGb. In an embodiment, for example, the logo compensator 230 may determine whether the fixed image is included in the N-th frame by comparing the grayscale of the N-th frame of the second input image data IMGb and the grayscale of the (N−1)-th frame.

In an embodiment, the logo compensator 230 may determine that the logo is included in the second input image data IMGb when the fixed image is maintained for a reference time or longer in frames included in the second input image data IMGb. In an embodiment, for example, the reference time may be a predetermined number of frames. That is, the logo compensator 230 may determine that the fixed image is logo, when the fixed image is maintained for more than a predetermined number of frames in the second input image data IMGb (that is, when the fixed image is recognized for a predetermined number of frames). The reference time may be set to an appropriate value for determining the logo.

In an embodiment, the logo compensator 230 may determine that the logo is included in the second input image data IMGb, when the fixed image is maintained for more than the reference time in the frames included in the second input image data IMGb and a size of the fixed image is within a reference size range. In an embodiment, for example, the reference size range may be a preset value corresponding to a size of a general logo area. Accordingly, a fixed image larger than the reference size range or a fixed image smaller than the reference size range may not be determined as the logo.

If the N-th frame is the black image frame BF, the logo compensator 230 may determine that the fixed image is not included in the N-th frame when the rule above is applied. That is, when the logo compensator 230 determines whether the reference time of the fixed image is maintained in all of the second input image data IMGb in which the normal image frames IF and the black image frames BF are alternated, it may be determined that the logo is not always included in the second input image data IMGb. To prevent this, in an embodiment, the logo compensator 230 may further receive the flag FG from the host 20. Also, the operation of the logo compensator 230 may vary according to the type of the N-th frame (e.g., whether it is the normal image frame IF or the black image frame BF).

In an embodiment, the logo compensator 230 may determine that the logo is included in the image data IMGb, when the fixed image is maintained for more than the reference time in normal image frames IF among frames included in the second input image data IMGb. That is, the logo compensator 230 may determine whether the logo is included, based on the normal image frames IF except for the black image frames BF among the frames included in the second input image data IMGb.

In another embodiment, the logo compensator 230 may determine that the logo is included in the second input image data IMGb, when the fixed image maintains more than the reference time in all of the normal image frames IF and the black image frames BF included in the second input image data IMGb. In this case, if the N-th frame is the black image frame BF, the logo compensator 230 may maintain the operation state of the previous frame (N−1)-th frame. That is, if the N-th frame is the black image frame BF, the logo compensator 230 may determine that the fixed image exists in the N-th frame when the fixed image exists in the (N−1)-th frame, and determine that the fixed image does not exist in the N-th frame when the fixed image does not exist in the (N−1)-th frame.

When it is determined that the logo is included in the second input image data IMGb, the logo compensator 230 may generate a first compensation value CP1 for compensating the first scale factor SF1. In an embodiment, for example, the first compensation value CP1 may correspond to a logo area in which the logo is located. In an embodiment, for example, the second scale factor SF2 to which the first compensation value CP1 is reflected may have a different value in the logo area from in an area other than the logo area.

In an embodiment, as illustrated in FIG. 4, the driving controller 200 may further include a screen saver 240.

The screen saver 240 may receive the second input image data IMGb from the host 20. The screen saver 240 may determine whether a still image is included in the second input image data IMGb. When it is determined that the still image is included in the second input image data IMGb, the screen saver 240 may generate a second compensation value CP2 for compensating the first scale factor SF1, and output the second compensation value CP2 to the net power controller 210. The net power controller 210 may generate the second scale factor SF2 by reflecting the second compensation value CP2 in the first scale factor SF1.

In an embodiment, for example, the screen saver 240 may determine whether the (N−1)-th frame and the N-th frame are entirely the same image by comparing the grayscale of the N-th frame and the grayscale of the (N−1)-th frame of the second input image data IMGb.

In an embodiment, when the same image is maintained for more than a reference time in frames included in the second input image data IMGb, the screen saver 240 may determine that a still image is included in the second input image data IMGb. In an embodiment, for example, the reference time may be a predetermined number of frames. That is, when the same image is maintained for more than a predetermined number of frames in the second input image data IMGb (that is, when the same image is recognized for a predetermined number of frames), the screen saver 240 may determine the image as a still image. The reference time may be set to an appropriate value for determining the still image.

When the N-th frame is a black image frame BF, the N-th frame and the (N−1)-th frame that is the normal image frame IF may be determined to be different images. Accordingly, when the screen saver 240 determines whether the reference time of the same image is maintained in all of the second input image data IMGb in which the normal image frames IF and the black image frames BF are alternated, it may be determined that the still image is not always included in the second input image data IMGb. To prevent this, the screen saver 240 may further receive the flag FG from the host 20.

Also, the operation of the screen saver 240 may vary according to the type of the N-th frame (e.g., whether the normal image frame IF or the black image frame BF).

In an embodiment, when the same image is maintained for more than the reference time in the normal image frames IF among frames included in the second input image data IMGb, the screen saver 240 may determine that the still image is included in the second input image data IMGb. That is, the screen saver 240 may determine whether the still image is included based on the normal image frames IF except for the black image frames BF among the frames included in the second input image data IMGb.

In another embodiment, when the same image is maintained for more than the reference time in all of the normal image frames IF and the black image frames BF included in the second input image data IMGb, the screen saver 240 may determine that the still image is included in the second input image data IMGb. In this case, if the N-th frame is the black image frame BF, the screen saver 240 may maintain the operation state of the previous frame. That is, if the N-th frame is the black image frame BF, the screen saver 240 may determine that the N-th frame includes the same image as the (N−1)-th frame.

When it is determined that the still image is included in the second input image data IMGb, the screen saver 240 may generate the second compensation value CP2 to compensate the first scale factor SF1.

In an embodiment, as illustrated in FIG. 4, the driving controller 200 may further include a global current manager 250.

The global current manager 250 may receive the second input image data IMGb and the first scale factor SF1 from the net power controller 210. The global current manager 250 may calculate a target current based on the second input image data IMGb and the first scale factor SF1.

The global current manager 250 may receive a sensing current IS from a current sensor (not illustrated). In an embodiment, for example, the sensing current IS may be a current commonly applied to all pixels P through a power voltage line.

The global current manager 250 may generate a third compensation value CP3 for compensating the first scale factor SF1 by comparing the target current with the sensing current IS, and output the third compensation value CP3 to the net power controller 210. The net power controller 210 may generate the second scale factor SF2 by reflecting the third compensation value CP3 in the first scale factor SF1.

The target current may be calculated in units of frames. Since it takes a certain time for the global current manager 250 to calculate the target current of the second input image data IMGb, one frame delay may be applied to the global current management operation. That is, the global current manager 250 may calculate a target current corresponding to the N-th frame based on the N-th frame of the second input image data IMGb and the first scale factor SF1 corresponding to the N-th frame. The global current manager 250 may generate the third compensation value CP3 by comparing the sensing current IS and the target current corresponding to the N-th frame, and output the third compensation value CP3 to the net power controller 210. The net power controller 210 may generate the second scale factor SF2 by reflecting the third compensation value CP3 corresponding to the N-th frame in the first scale factor SF1 corresponding to the N-th frame, may generate the intermediate image data IMG2 by adjusting the grayscale of the (N+1)-th frame by applying the second scale factor SF2 corresponding to the N-th frame.

In an embodiment, the global current manager 250 may further receive the flag FG from the net power controller 210. The global current manager 250 may receive the flag FG from the host 20.

The operation of the global current manager 250 may vary according to the type of the N-th frame (e.g., whether the normal image frame IF or the black image frame BF). In an embodiment, for example, if the N-th frame is the black image frame BF, the global current manager 250 may maintain the operation state of the previous frame. That is, if the N-th frame is the black image frame BF, the global current manager 250 may generate the same value as the third compensation value CP3 corresponding to the (N−1)-th frame which is the normal image frame IF as the third compensation value CP3 corresponding to the N-th frame.

In an embodiment, as illustrated in FIG. 4, the driving controller 200 may further include a power voltage compensator 260.

The power voltage compensator 260 may receive the second input image data IMGb and the first scale factor SF1 from the net power controller 210. The power voltage compensator 260 may generate a power voltage control signal EC based on the second input image data IMGb and the first scale factor SF1 and output the power voltage control signal EC to the power voltage generator 600. In an embodiment, for example, the power voltage control signal EC may be a control signal for adjusting the power voltage to an optimal voltage for operating driving transistors of the pixels P in a saturation region. The power voltage generator 600 may generate the power voltage ELVDD in response to the fourth control signal CONT4 including the power voltage control signal EC, and output the power voltage ELVDD to the display panel 100. Accordingly, power consumption of the display apparatus 10 may be reduced.

The power voltage control signal EC may be calculated in units of frames. Since it takes a certain time for the power voltage compensator 260 to calculate the power voltage control signal EC based on the second input image data IMGb, one frame delay may be applied to the power voltage compensation operation. That is, the power voltage compensator 260 may generate the power voltage control signal EC corresponding to the N-th frame based on the N-th frame of the second input image data IMGb and the first scale factor SF1 corresponding to the N-th frame and output the power voltage control signal EC to the power voltage generator 600. The power voltage generator 600 may generate the power voltage ELVDD of the (N+1)-th frame by reflecting the power voltage control signal EC corresponding to the N-th frame and output the power voltage control signal EC to the display panel 100.

In an embodiment, the power voltage generator 600 may further receive the flag FG from the net power controller 210. The power voltage generator 600 may receive the flag FG from the host 20.

The operation of the power voltage generator 600 may vary according to the type of the N-th frame (e.g., whether the normal image frame IF or the black image frame BF). In an embodiment, for example, if the N-th frame is the black image frame BF, the power voltage generator 600 may maintain the operation state of the previous frame. That is, if the N-th frame is the black image frame BF, the power voltage generator 600 may generate the same value as the power voltage control signal EC corresponding to the (N−1)-th frame which is the normal image frame IF as the power voltage control signal EC corresponding to the N-th frame.

In embodiments of the present disclosure, in the second mode, the driving controller 200 may receive the second input image data including the normal image frames IF and the black image frames BF and the flag FG indicating the type of each of the frames included in the second input image data IMGb. Accordingly, the driving controller 200 may be accurately inputted whether each frame included in the second input image data IMGb is the normal image frame IF or the black image frame BF. The driving controller 200 may generate the intermediate image data IMG2 by appropriately calculating the scale factor and the compensation value to adjust the grayscale of the second input image data IMGb based on this. Accordingly, it is possible to prevent a decrease in display quality of the display apparatus 10 due to a malfunction of the driving controller 200 in the second mode.

In an embodiment, for example, in a case of a control operation to which one frame delay is applied (e.g., the net power control operation, the global current management operation, the power voltage compensation operation, etc.), if the N-th frame is the black image frame BF, the driving controller 200 may maintain the state of the (N−1)-th frame that is the normal image frame IF. In an embodiment, for example, in the case of a control operation of determining whether to compensate (e.g., logo determination, still image determination, etc.) based on whether a reference time of a predetermined image is maintained, if the N-th frame is the black image frame BF, the driving controller 200 may maintain the state of the (N−1)-th frame which is the normal image frame IF, or operate based on the normal image frames IF except for the black image frame BF. Accordingly, it is possible to prevent a decrease in display quality of the display apparatus 10 due to a malfunction of the driving controller 200 in the second mode.

Figure 6:
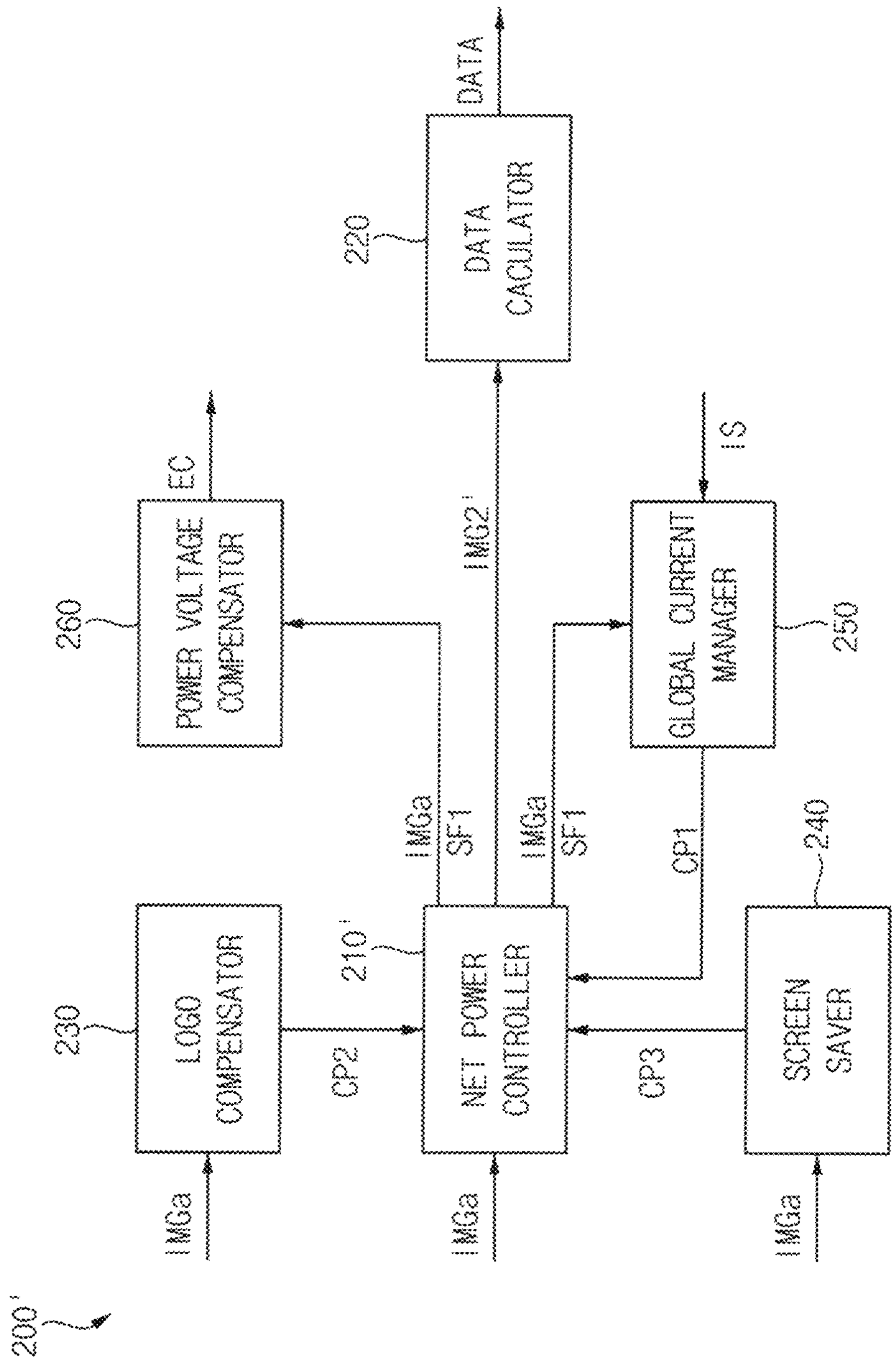
FIG. 6 is a block diagram illustrating another example of a driving controller of FIG. 1.
Figure 7:
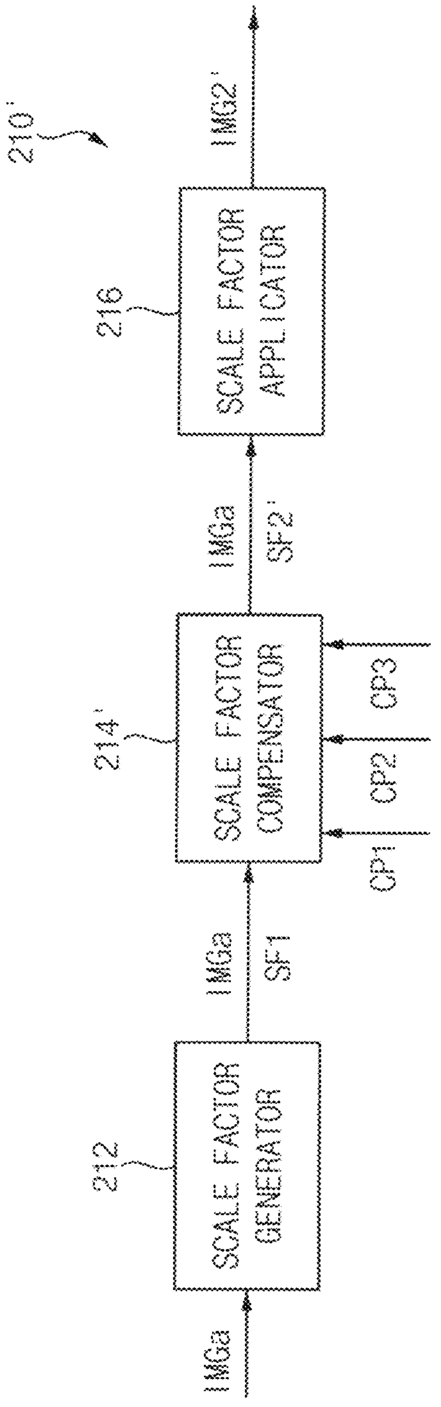
FIG. 7 is a block diagram illustrating a net power controller of FIG. 6.
Figure 8:
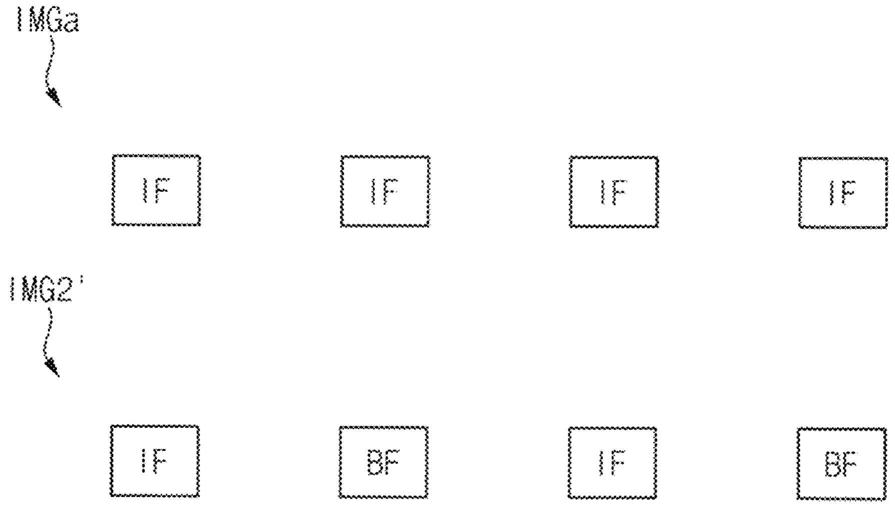
FIG. 8 is a conceptual diagram illustrating input image data and intermediate image data of FIG. 6.

FIG. 6 is a block diagram illustrating another example of a driving controller of FIG. 1. FIG. 7 is a block diagram illustrating a net power controller of FIG. 6. FIG. 8 is a conceptual diagram illustrating input image data and intermediate image data of FIG. 6.

Hereinafter, a driving controller 200' according to another embodiment will be described with a focus on the differences from the driving controller 200 according to the embodiment described with reference to FIGS. 4 and 5, and repeated descriptions will be omitted or simplified.

Referring to FIGS. 1, 6, 7 and 8, in an embodiment, a driving controller 200' may receive input image data IMG and an input control signal CONT from the host 20. The driving controller 200' may further receive a mode start signal MSS indicating a start of a second mode or a mode end signal MSE indicating an end of the second mode from the host 20.

In an embodiment, the driving controller 200' may receive first input image data IMGa including a plurality of normal image frames IF from the host 20 in the second mode as well as in the first mode. That is, all of frames of the input image data IMG inputted in the first mode and the second mode may be the normal image frames IF. Accordingly, unlike illustrated in FIG. 1, the driving controller 200' may not receive the flag FG from the host 20 in the second mode.

The driving controller 200' may generate intermediate image data IMG2' by receiving the first input image data IMGa from the host 20, and adjusting the grayscale of the first input image data IMGa. The driving controller 200' may generate a data signal DATA based on the intermediate image data IMG2' and output the data signal DATA to the data driver 500.

In an embodiment, as illustrated in FIG. 8, the driving controller 200' may generate the intermediate image data IMG2' by converting some of the normal image frames IF included in the first input image data IMGa to the black image frame BF in the second mode (e.g., during a period from when time of receiving the mode start signal MSS to before receiving the mode end signal MSE). In an embodiment, for example, in the second mode, the driving controller 200' may generate the intermediate image data IMG2' by converting any one of odd-numbered frames and even-numbered frames among the normal image frames IF included in the first input image data IMGa to the black image frame BF (e.g., generating a scale factor to 0).

In an embodiment, as illustrated in FIG. 6, the driving controller 200' may include a net power controller 210' and a data calculator 220.

The net power controller 210' may generate the intermediate image data IMG2' based on the first input image data IMGa. In an embodiment, for example, the net power controller 210' may calculate a load of the first input image data IMGa, and generate a scale factor by comparing the load of the first input image data IMGa and a reference load. The net power controller 210' may generate the intermediate image data IMG2' by reducing or maintaining the grayscale value of the first input image data IMGa by applying the scale factor. The load of the first input image data IMGa and the scale factor may be calculated in units of frames.

Since it takes a certain time for the net power controller 210' to calculate the load of the first input image data IMGa, one frame delay may be applied to the net power control operation. That is, the net power controller 210' may generate a scale factor corresponding to the K-th frame by comparing the K-th frame load of the first input image data IMGa and the reference load, and generate the intermediate image data IMG2' by adjusting the scale factor of the grayscale of a (K+1)-th frame by applying the scale factor corresponding to the K-th frame (K is a natural number equal to or greater than 1). In an embodiment, for example, when the load of the K-th frame exceeds the reference load, a net power control operation may be turned on in the (K+1)-th frame, and when the load of the K-th frame is less than or equal to the reference load, the net power control operation may be turned off in the (K+1)-th frame.

In an embodiment, the net power controller 210' may include a scale factor generator 212, a scale factor compensator 214', and a scale factor applicator 216.

The scale factor generator 212 may receive the first input image data IMGa from the host 20. The scale factor generator 212 may calculate a load of the first input image data IMGa based on the grayscale of the first input image data IMGa and generate a first scale factor SF1 of the first input image data IMGa by comparing the load of the first input image data IMGa and a reference load. In an embodiment, for example, the first scale factor SF1 may be greater than or equal to 0 and less than or equal to 1.

The scale factor generator 212 may calculate and generate the load of the first input image data IMGa and the first scale factor SF1 in units of frames.

The scale factor compensator 214' may receive the first input image data IMGa and the first scale factor SF1 from the scale factor generator 212. The scale factor compensator 214' may generate the second scale factor SF2' of the first input image data IMG1 by reflecting a compensation value to the first scale factor SF1. In an embodiment, for example, the second scale factor SF2' may be greater than or equal to 0 and less than or equal to 1.

The scale factor compensator 214' may generate a second scale factor SF2' of the first input image data IMGa in units of frames. In this case, the scale factor compensator 214' may generate the second scale factor SF2' as 0 with respect to some of the normal image frames IF included in the first input image data IMGa in the second mode. In an embodiment, for example, the scale factor compensator 214' may generate any one of odd-numbered frames and even-numbered frames among the normal image frames IF included in the first input image data IMGa as 0 in the second mode.

The scale factor applicator 216 may receive the first input image data IMGa and the second scale factor SF2' from the scale factor compensator 214'. The scale factor applicator 216 may generate the intermediate image data IMG2' by applying the second scale factor SF2' to the first input image data IMGa by adjusting the grayscale of the first input image data IMGa.

The scale factor applicator 216 may generate the intermediate image data IMG2' by applying the second scale factor SF2' to the first input image data IMGa in units of frames. Accordingly, as illustrated in FIG. 8, the intermediate image data IMG2' including the normal image frames IF and the black image frames BF in the second mode. In an embodiment, for example, in the intermediate image data IMG2' in the second mode, the normal image frames IF and the black image frames BF may be alternated.

In an embodiment, as illustrated in FIG. 6, the driving controller 200' may further include a logo compensator 230, a screen saver 240, a global current manager 250, and a power voltage compensator 260. The logo compensator 230, the screen saver 240, the global current manager 250, and the power voltage compensator 260 may be substantially equal to or similar to those described with reference to FIG. 4.

In the present embodiment, since all of the frames included in the first input image data IMGa are the normal image frames IF, the logo compensator 230, the screen saver 240, the global current manager 250 and the power voltage compensator 260 may operate substantially equal to or similar to each of the frames included in the first input image data IMGa. That is, the logo compensator 230, the screen saver 240, the global current manager 250, and the power voltage compensator 260 may normally generate compensation values for compensating the first scale factor SF1 corresponding to the K-th frame. The net power controller 210' may generate the second scale factor SF2' by reflecting the compensation values CP1, CP2, and CP3 in the first scale factor SF1 corresponding to the K-th frame. In this case, in the second mode, when the K-th frame is an odd-numbered frame (or an even-numbered frame), the net power controller 210' may generate the second scale factor SF2' as 0. Accordingly, in the second mode, the net power controller 210' may generate the intermediate image data IMG2' in which the normal image frames IF and the black image frames BF are alternated.

In embodiments of the present disclosure, the driving controller 200' may receive the first input image data IMGa including the normal image frames IF from the host 20. The driving controller 200' may generate the intermediate image data IMG2' by appropriately calculating a scale factor and a compensation value for adjusting the grayscale of the first input image data IMGa based on this. In addition, in the second mode, the driving controller 200' may generate the intermediate image data IMG2' by converting some of the general image frames IF included in the first input image data IMGa to the black image frame BF. In an embodiment, for example, in the second mode, the driving controller 200' may generate a final scale factor with respect to any one of odd-numbered frames or even-numbered frames among the normal image frames IF included in the first input image data IMGa as 0. Accordingly, it is possible to prevent a decrease in display quality of the display apparatus 10 due to a malfunction of the driving controller 200' in the second mode.

The display apparatus and the method according to the embodiments may be applied to a display apparatus included in a computer, a notebook, a mobile phone, a smartphone, a smart pad, a PMP, a PDA, an MP3 player, or the like.

Although the display apparatus and the method according to the embodiments have been described with reference to the drawings, the illustrated embodiments are examples, and may be modified and changed by a person having ordinary knowledge in the relevant technical field without departing from the technical spirit described in the following claims.

What is claimed is:

1. A display apparatus comprising:

a display panel;

a driving controller, which receives input image data including a plurality of normal image frames and a plurality of black image frames, receives a flag indicating a type of each of frames included in the input image data, generates intermediate image data by adjusting a grayscale of the input image data based on the input image data and the flag, and generates a data signal based on the intermediate image data, wherein the type includes a normal image frame and a black image frame; and a data driver, which generates a data voltage based on the data signal and outputs the data voltage to the display panel, wherein the driving controller includes a net power controller, which generates a first scale factor based on an N-th frame among the frames included in the input image data, generates a second scale factor by reflecting a compensation value in the first scale factor, and generates the intermediate image data by adjusting a grayscale of an (N+1)-th frame by applying the second scale factor corresponding to the N-th frame if the N-th frame is the normal image frame and by applying the second scale factor corresponding to the (N−1)-th frame if the N-th frame is the black image frame, and wherein N is a natural number equal to or greater than 2.

2. The display apparatus of claim 1, wherein in the input image data, the normal image frames and the black image frames are alternated.

3. The display apparatus of claim 2, wherein the flag indicates whether each of the frames included in the input image data is the normal image frame or the black image frame.

4. The display apparatus of claim 1, wherein the driving controller further includes a logo compensator, which determines that a logo is included in the input image data, when a fixed image within a reference size range in the frames included in the input image data is maintained for a predetermined number of frames, and generates a first compensation value to compensate the first scale factor.

5. The display apparatus of claim 4, wherein the logo compensator determines that the logo is included in the input image data, when the fixed image is maintained in the normal image frames among the frames included in the input image data for a predetermined number of the normal image frames.

6. The display apparatus of claim 4, wherein the logo compensator determines that the logo is included in the input image data, when the fixed image is maintained in the predetermined number of the frames included in the input image data, determine that the fixed image exists in the N-th frame when the fixed image exists in an (N−1)-th frame if the N-th frame is the black image frame, and determine that the fixed image does not exist in the N-th frame when the fixed image does not exist in the (N−1)-th frame if the N-th frame is the black image frame.

7. The display apparatus of claim 1, wherein the driving controller further includes a screen saver, which determines that a still image is included in the input image data, when a same image in the frames included in the input image data is maintained for a predetermined number of frames, and generates a second compensation value to compensate the first scale factor.

8. The display apparatus of claim 7, wherein the screen saver determines that the still image is included in the input image data, when the same image is maintained in the normal image frames among the frames included in the input image data for the predetermined number of the normal image frames.

9. The display apparatus of claim 7, wherein the screen saver determines that the still image is included in the input image data, when the same image is maintained in the predetermined number of the frames included in the input image data, and determines whether the N-th frame includes the same image as an (N−1)-th frame if the N-th frame is the black image frame.

10. The display apparatus of claim 1, wherein the driving controller further includes a global current manager, which calculates a target current based on and the N-th frame and the first scale factor generated based on the N-th frame, and generates a third compensation value to compensate the first scale factor by comparing the target current and a sensing current of the display panel.

11. The display apparatus of claim 10, wherein if the N-th frame is the black image frame, the global current manager generates a same value as the third compensation value corresponding to a (N−1)-th frame to the third compensation value corresponding to the N-th frame.

12. The display apparatus of claim 1, further comprising a power voltage generator, which generates a power voltage and outputs the power voltage to the display panel, and wherein the driving controller further includes a power voltage compensator, which generates a power voltage control signal based on the N-th frame and the first scale factor generated based on the N-th frame, and the power voltage generator generates the power voltage of an (N+1)-th frame by reflecting the power voltage control signal corresponding to the N-th frame.

13. The display apparatus of claim 12, wherein if the N-th frame is the black image frame, the power voltage compensator generates a same signal as the power voltage control signal corresponding to an (N−1)-th frame to the power voltage control signal corresponding to the N-th frame.

14. A display apparatus comprising:

a display panel;

a driving controller, which receives input image data including a plurality of normal image frames, converts some of the normal image frames into black image frames by adjusting a grayscale of the input image data, and generates a data signal based on the converted input image data; and a data driver, which generates a data voltage based on the data signal and outputs the data voltage to the display panel.

15. The display apparatus of claim 14, wherein the driving controller includes a net power controller, which generates a first scale factor based on a K-th frame among the normal image frames included in the input image data, generates a second scale factor by reflecting a compensation value in the first scale factor, and converts the input image data by adjusting a grayscale of a (K+1)-th frame by applying the second scale factor corresponding to the K-th frame, and the net power controller generates the second scale factor as 0 with respect to any one of odd-numbered frames and even-numbered frames among the normal image frames included in the input image data, wherein K is a natural number equal to or greater than 1.

16. The display apparatus of claim 15, wherein the driving controller further includes a logo compensator, which determines that a logo is included in the input image data, when a fixed image within a reference size range in the normal image frames included in the input image data is maintained for a predetermined number of frames, and generates a first compensation value to compensate the first scale factor.

17. The display apparatus of claim 15, wherein the driving controller further includes a screen saver, which determines that a still image is included in the input image data, when a same image in the normal image frames included in the input image data is maintained for a predetermined number of frames, and generates a second compensation value to compensate the first scale factor.

18. The display apparatus of claim 15, wherein the driving controller further includes a global current manager, which calculates a target current based on the N-th frame and the first scale factor generated based on the N-th frame, and generates a third compensation value to compensate the first scale factor by comparing the target current and a sensing current of the display panel.

19. The display apparatus of claim 15, further comprising a power voltage generator, which generates a power voltage and outputs the power voltage to the display panel, and wherein the driving controller further includes a power voltage compensator, which generates a power voltage control signal based on the K-th frame and the first scale factor generated based on the K-th frame, and the power voltage generator generates the power voltage of a (K+1)-th frame by reflecting the power voltage control signal corresponding to the K-th frame.

20. A method of driving a display apparatus, the method comprising:

receiving input image data including a plurality of normal image frames and a plurality of black image frames and receiving a flag indicating a type of each of frames included in the input image data, wherein the type includes a normal image frame and a black image frame;

generating intermediate image data by adjusting a grayscale of the input image data based on the input image data and the flag;

generating a data signal based on the intermediate image data; and generating a data voltage based on the data signal and outputting the data voltage to the display panel, wherein the generating intermediate image data comprises:

generating a first scale factor based on an N-th frame among the frames included in the input image data, generating a second scale factor by reflecting a compensation value in the first scale factor, and generating the intermediate image data by adjusting a grayscale of an (N+1)-th frame by applying the second scale factor corresponding to the N-th frame in a case that the N-th frame is the normal image frame and by applying the second scale factor corresponding to an (N−1)-th frame in a case that the N-th frame is the black image frame, wherein N is a natural number equal to or greater than 2.

21. The method of claim 20, wherein in the input image data, the normal image frames and the black image frames are alternated.

22. The method of claim 21, wherein the flag indicates whether each of the frames included in the input image data is the normal image frame or the black image frame.

* * * * *